United States Patent
Kim

(10) Patent No.: US 6,364,342 B1
(45) Date of Patent: Apr. 2, 2002

(54) RETAINER RING HAVING AIR DEFLECTOR AND AIRBAG MOUNTING STRUCTURE USING THE SAME

(75) Inventor: Joon-ho Kim, Seoul (KR)

(73) Assignee: Delphi Automotive Sysetms Sungwoo Corporation (KR)

( * ) Notice: Subject to any disclaimer, the term of this patent is extended or adjusted under 35 U.S.C. 154(b) by 0 days.

(21) Appl. No.: 09/478,178

(22) Filed: Jan. 5, 2000

(51) Int. Cl.[7] .............................................. B60R 21/26
(52) U.S. Cl. ..................... 280/728.2; 280/736; 280/740; 280/742
(58) Field of Search .............................. 280/728.2, 736, 280/740, 741, 742

(56) References Cited

U.S. PATENT DOCUMENTS

| | | | | |
|---|---|---|---|---|
| 5,022,676 A | * | 6/1991 | Rogerson et al. | 280/743 |
| 5,064,218 A | * | 11/1991 | Hartmeyer | 280/743 |
| 5,277,442 A | * | 1/1994 | Cuevas | 280/731 |
| 5,368,327 A | | 11/1994 | Shiraki et al. | 280/728 A |
| 5,388,858 A | * | 2/1995 | Cuevas | 280/728 |
| 5,501,484 A | * | 3/1996 | Saderholm et al. | 280/728.2 |
| 5,542,692 A | * | 8/1996 | Shaklik et al. | 280/728.2 |
| 5,542,693 A | * | 8/1996 | Koide | 280/728.2 |
| 5,615,907 A | * | 4/1997 | Stanger | 280/728.2 |
| 5,658,008 A | * | 8/1997 | Herrmann et al. | 280/728.2 |
| 5,683,100 A | * | 11/1997 | Enders | 280/728.2 |
| 5,762,361 A | * | 6/1998 | Herrmann et al. | 280/728.2 |
| 5,836,608 A | | 11/1998 | Soderquist et al. | 280/728.2 |
| 5,860,672 A | * | 1/1999 | Petersen | 280/728.2 |
| 6,017,054 A | * | 1/2000 | Magoteaux | 280/728.2 |

* cited by examiner

Primary Examiner—J. J. Swann
Assistant Examiner—J. Allen Shriver
(74) Attorney, Agent, or Firm—Fish & Richardson P.C.

(57) ABSTRACT

A retainer ring having an air deflector, for use with an airbag mounting structure, includes a flange in which an inflater opening for receiving an inflater is formed; and a wall, a base of which is connected to the flange, extending upward and outward from the inflater opening at a predetermined angle to diffuse and deflect exploding gas upward. The wall, which realizes a simplified configuration for the retainer ring, may include convex portions projecting inwardly towards the inflater opening, being regularly spaced, and rib formations integrally formed on an inner side of the wall between the convex portions. The rib formations are evenly spaced, as a pair of rows covering the height of the inner side of the wall, and slope downward on either side of the convex portions. The airbag mounting structure clamps the inflater and the airbag between the retainer ring and a baseplate, which is mounted to a support within an automobile. To determine a mounting position and orientation, a tabbed cut-out is formed in the retainer ring, juxtaposed to a coupling hole thereof, and is bent at a right angle to pass through an alignment notch formed in a flange of the inflater and a series of alignment holes formed in the other components.

15 Claims, 4 Drawing Sheets

RETAINER RING HAVING AIR DEFLECTOR AND AIRBAG MOUNTING STRUCTURE USING THE SAME

BACKGROUND OF THE INVENTION

1. Field of the Invention

The present invention is related to an airbag system as a safety device for an automobile, and in particular, to an airbag mounting structure by which an airbag system is installed in an automobile using a retainer ring having an air deflector of a simple structure.

2. Discussion of the Related Art

Generally, an airbag system is mounted on a steering wheel or the upper portion of a dash panel of an automotive vehicle, to promote the safety of the driver and possibly another occupant. In such a system, when a sensor detects an abrupt reduction in the vehicle's traveling speed caused by, for example, a traffic accident, an inflater is activated to introduce high-temperature, pressurized gas into an airbag.

Typically, an airbag system is largely comprised of: an inflater for generating gas very rapidly and expelling the generated gas via a plurality of radially disposed inflation ports to evenly inflate a folded airbag, an operation referred to as "exploding" the inflater; an airbag having an inflater opening for receiving the inflater in order to introduce the gas into the airbag; a baseplate, disposed between the airbag and a flange of the inflater, to which the system components are mounted; and a retainer ring, disposed around the opening and opposing the flange, to hold the system components in place. Each of the system components has a plurality of coupling holes arranged around a central opening or, in the case of the inflater, around the inflater itself. In assembly, the inflater is seated against the bottom of the baseplate so as to protrude through the central openings, and the retainer ring and baseplate are coupled together via the coupling holes to be held tight (clamped) for the life of the airbag system prior to its use, which may be several years. A typical airbag is also provided with a throat portion of a predetermined area extending outward from the opening, which is coupled with a tether to regulate the deployment direction of the airbag. The throat portion includes a reinforced material of a predetermined horizontal tension force, to hold the tether in place upon the exploding of the inflater and to bolster the operation of the retainer ring.

The primary problem present in such an airbag system is that, while in a tightly clamped configuration between the retainer ring and baseplate, the inner edges (perimeter) of the opening of the airbag, facing the centrally mounted inflater, are exposed to the hot gas (e.g., air) rushing out through the inflation ports. Thus, upon exploding the inflater, the opening of the airbag is subject to being burned. A burned or singed airbag opening, particularly one fatigued by a lengthy period in a tightly clamped state, deteriorates the airbag's operational condition and contributes to a shear stress on the airbag opening introduced due to pulling forces exerted at the coupling points by the rushing gas rapidly filling the airbag, thus degrading performance.

Japanese Patent Laid-open Publication No. hei 3-169765 discloses an airbag system including a rubber collar having an annular fillet disposed around the airbag opening. The rubber collar is placed between the airbag and the retainer ring, such that the annular fillet serves to protect the opening of the airbag from the exploding hot gas. The rubber sheet, however, besides being an additional component which complicates airbag manufacture and increases cost, may exacerbate the shear stress exerted on the airbag opening, due a deformation of the rubber sheet itself, or may loosen the clamping state of the airbag with respect to the baseplate, especially if long-term clamping is to be maintained. Moreover, the annular fillet is ineffective in protecting the edges of the opening of the airbag.

Meanwhile, U.S. Pat. No. 5,368,327 discloses an airbag device for reducing the number of steps needed to manufacture an airbag device while relieving the adverse effects of the shear stress (horizontal tension force) on the airbag. The '327 patent describes an airbag device in which various protrusions are inserted through intermediately spaced coupling holes, to be displaced by rushing gas and thereby counteract the pulling force caused when the airbag is quickly filled with gas. Though the protrusions can neutralize the horizontal tension force at the opening of the airbag, the opening is still exposed to the hot gas rushing into the airbag from the inflater. Moreover, the airflow into the airbag during rapid inflation is poorly controlled such that skewing may result.

Therefore, it is most appropriate to protect the airbag from the effects of the pressurized, high-temperature gas as well as to neutralize the horizontal tension force.

U.S. Pat. No. 5,836,608 teaches an airbag deflection mount for directing the hot gas into the airbag during inflation, as shown in FIG. 1.

The airbag deflection mount includes a retainer ring comprising: a substantially square outer wall 4 having a coupling hole 3 formed in each corner; an air deflector 2 consisting of a substantially upright inner wall 6 defining an opening 1 for receiving an inflater and twelve equally spaced ears 5 for deflecting air; and a bottom surface 7, connecting the bases of the inner and outer walls, for clamping the collar of the airbag opening in place against the baseplate (not shown). The outer wall slopes away from the opening 1 at an angle of 115° with respect to the baseplate, while the deflecting ears 5 slope in the same direction at an angle of 75° with respect thereto.

The above-described airbag deflection mount, however, is ineffective in protecting the edges of the opening (throat) of the airbag from the hot gas expelled from the inflater, which is forced out of the inflation ports and against the inner wall, thus coming into contact with the throat and burning the airbag. Most importantly, the airbag deflection mount, with its complex configuration of outer wall and inner wall with multiple deflectors, still fails to deflect large portions of the inflation gas and cannot effectively guide the rushing gas in the desired direction due to the spaces between the ears (deflectors) which produce severe pressure differentials and turbulence. Moreover, such an airbag deflection mount relies heavily on a proper alignment of the ears with respect to the twelve inflation ports of a special inflater, so that a high degree of precision is required for its manufacture.

SUMMARY OF THE INVENTION

Accordingly, an object of the present invention is to provide a retainer ring having an air deflector for use with an airbag mounting structure, in which an airbag employed as an automobile safety device is protected from the effects of pressurized, high-temperature gas as well as an adverse horizontal tension force, which are generated upon exploding an inflater.

It is another object of the present invention to provide a retainer ring having an air deflector for use with an airbag mounting structure, in which the configuration of the retainer ring is simplified.

It is a yet another object of the present invention to provide a retainer ring having an air deflector for use with an airbag mounting structure, which prevents the inner edges of the throat of an airbag from being burned by hot gas rushing into the airbag from an inflater.

It is still another object of the present invention to provide a retainer ring having an air deflector for use with an airbag mounting structure, which facilitates the mounting of the airbag as well as the manufacture of its mounting structure.

It is still yet another object of the present invention to provide a retainer ring having an air deflector for use with an airbag mounting structure, which diffuses high-temperature, pressurized gas from an inflater radially and uniformly into the airbag, while preventing the gas from coming into contact with the throat of the airbag.

It is a further object of the present invention to provide a retainer ring having an air deflector for use with an airbag mounting structure, which provides a simplified alignment means for the mounting of the airbag system to a supported baseplate.

It is yet a further object of the present invention to provide an airbag mounting structure suitable for use with the retainer ring.

To achieve these and other advantages and in accordance with the purposed of the present invention, as embodied and broadly described herein, there is provided a retainer ring having an air deflector, for use with an airbag mounting structure, the retainer ring comprising: an upper flange in which an inflater opening for receiving an inflater is formed; and a wall, a base of which is connected to the upper flange, extending upward and outward from the inflater opening at a predetermined angle to diffuse and deflect exploding gas upward.

According to another aspect of the present invention there is also provided an airbag mounting structure comprising: an inflater including a plurality of inflation ports provided on a main body thereof and arranged around the circumference of the main body, and a lower flange in which a plurality of first coupling holes and an alignment notch are formed at predetermined positions; a baseplate in which a first circular opening is formed to seat the main body of the inflater, a plurality of second coupling holes and a first alignment hole, corresponding to the first coupling holes, being formed in the baseplate around the first circular opening; an airbag, in which a second circular opening is formed to receive the main body of the inflater, having a mounting surface provided around the second circular opening, in which a plurality of third coupling holes and a second alignment hole, corresponding to the first and second coupling holes and the first alignment hole, respectively, are formed; and a retainer ring in which a third circular opening is formed to receive the main body of the inflater, a plurality of fourth coupling holes and a third alignment hole being formed in an upper flange to correspond to the first, second, and third coupling holes and the first and second alignment holes, respectively, the retainer ring including an integrally formed air deflector and a tabbed cut-out juxtaposed to one of the fourth coupling holes, the tabbed cut-out being bent at a right angle. In the above structure, the tabbed cut-out passes through the alignment notch and the first, second, and third alignment holes during assembly, to determine a mounting position and orientation.

In a preferred embodiment, the airbag mounting structure further comprises a plurality of semi-circular convex portions projecting inwardly towards the inflater opening. The convex portions are regularly spaced around the circumference of the wall at positions corresponding to the first through fourth coupling holes and abutting a surface of the main body of the inflater when the inflater is seated with the baseplate, to thereby support the main body of the inflater.

In another preferred embodiment, the airbag mounting structure further comprises a plurality of rib formations integrally formed on an inner side of the wall between the convex portions. The rib formations are evenly spaced, as a pair of rows covering the height of the inner side of the wall, and slope downward on either side of the convex portions, to thereby block hot air from coming into contact with the airbag.

Therefore, according to the present invention, an airbag mounting structure comprises a retainer ring having an air deflector which directs the expelled gas into the airbag, while sustaining a horizontal tension force during inflation, to effectively prevent the hot gas from burning the throat of the airbag.

BRIEF DESCRIPTION OF THE DRAWINGS

The present invention will now be described in detail with reference to the accompanying drawings, which are included to provide a further understanding of the invention and are incorporated in and constitute a part of this specification in order to illustrate embodiments of the invention, and which, together with the following detailed description, serve to explain the principles of the invention. In the drawings.

DETAILED DESCRIPTION OF THE PREFERRED EMBODIMENTS

Figure 1:
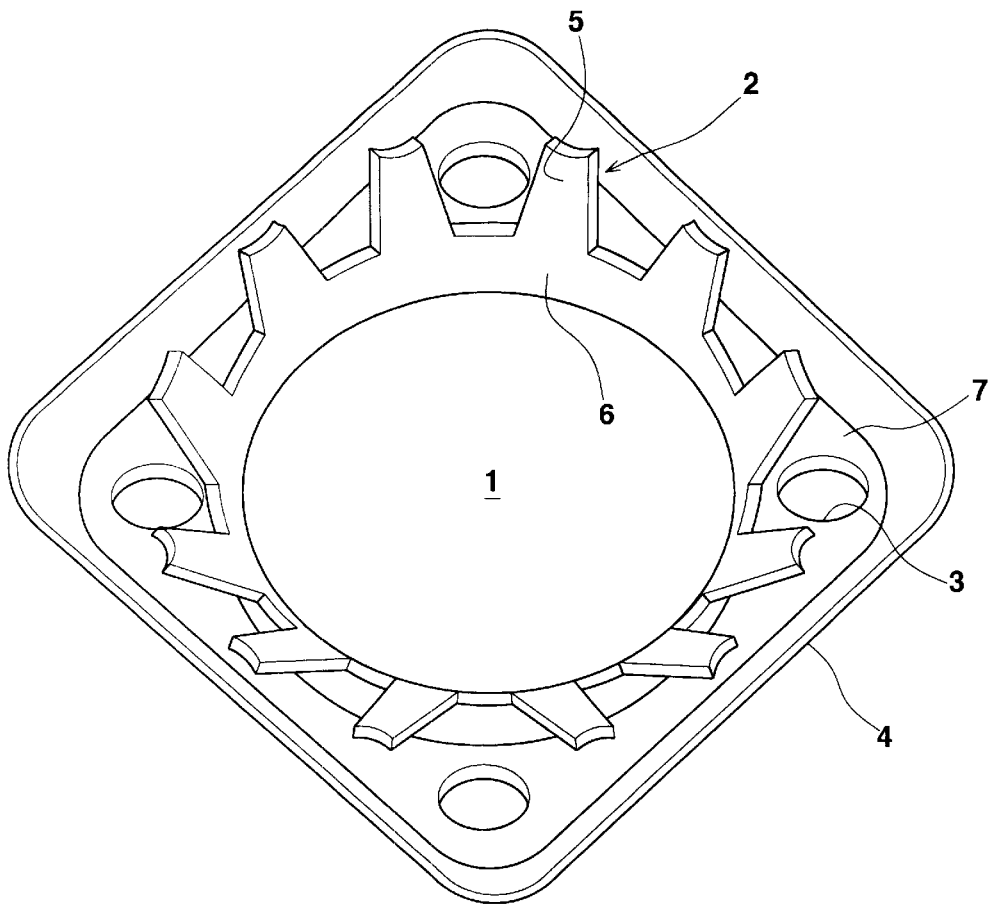
FIG. 1 is a perspective view of a conventional deflector for an airbag mounting structure.

Referring to FIGS. 2 through 5, an airbag mounting structure is largely comprised of a retainer ring 10, an airbag 20, a baseplate 30, and an inflater 40. The airbag 20 is mounted to the baseplate 30 and a substantially square lower flange 41 integrally formed with the inflater 40, using the retainer ring 10 and ordinary coupling means such as a bolt-and-nut configuration or rivets, such that a main body 44 of the inflater, where a plurality of inflation ports 47 are located, protrudes into the airbag's interior through circular inflater openings 11, 21, and 31 formed in the retainer ring, airbag, and baseplate, respectively. The coupling means passes through coupling holes 13, 23, 33, and 43 respectively formed to correspond to the corners of the lower flange 41.

The retainer ring 10 largely comprises an upper flange 16, having the inflater opening 11 formed therein, and an air deflector 14. The air deflector 14 is comprised of a wall 15, whose base is connected to the upper flange 16 and which extends upward and outward from the inflater opening 11 at a predetermined angle of 115~120°, so that the wall's distal end forms a round opening greater in diameter than that of the inflater openings. It is preferable that, after assembly, the top of the wall 15 is level with or higher than the top of the main body 44 of the inflater 40. The upper flange 16 is substantially rectangular in shape and has a tabbed cut-out 12 juxtaposed to one of the coupling holes 13, which is U-shaped and bent downward at a right angle to determine mounting position and orientation by alignment during assembly with corresponding alignment holes 22, 32, and 42 formed in the airbag 20, baseplate 30, and inflater 40, respectively. The alignment hole 42 is preferably a slotted notch to facilitate assembly, and the tabbed cut-out 12 may be of a squared shape.

The airbag 20 comprises a mounting surface 22a acting as a collar extending from the inflater opening 21 to have a predetermined width extending beyond that of the upper flange 16, to which a tether (not shown) may be coupled. The mounting surface 20a may include a heat-resistant coating layer (not shown) of insulating or fire-proof material formed on the top and bottom sides thereof.

Figure 2:
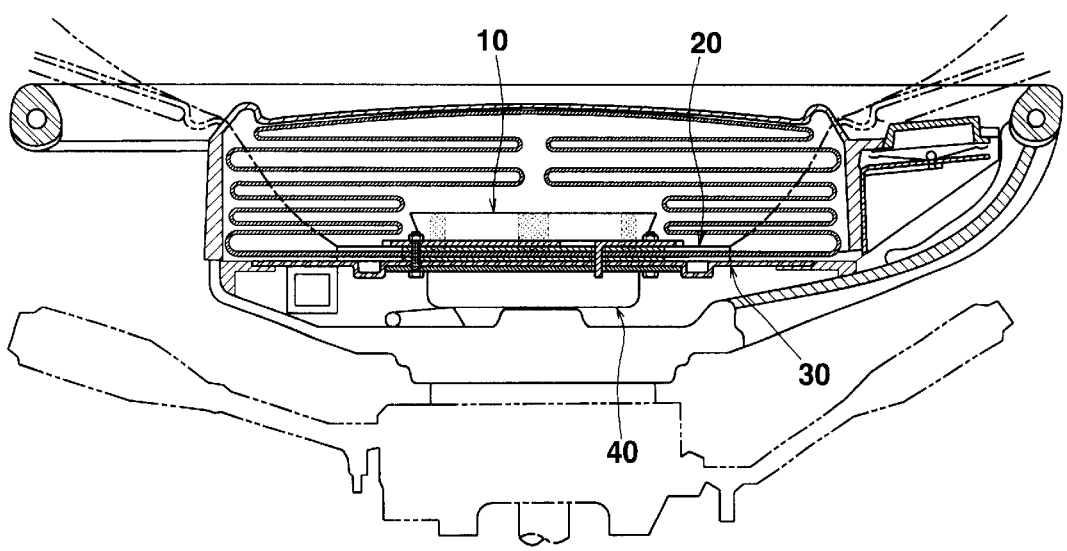
FIG. 2 is a partially cut-away top view showing an airbag mounting structure using a retainer ring having an air deflector, according to the present invention.
Figure 3:
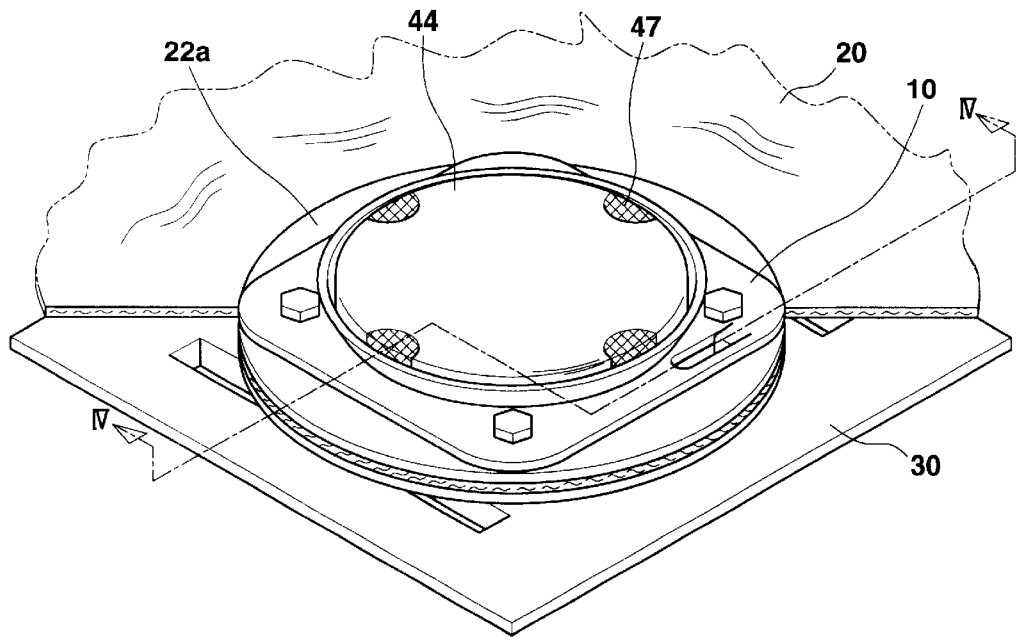
FIG. 3 is a perspective view of the airbag mounting structure shown in FIG. 2.

The baseplate 30 is mounted to a point on the automobile, such as a support of the steering wheel, as shown in FIG. 2.

The plurality of inflation ports 47 are evenly spaced around the circumference of the main body 44 of the inflater 40, to ensure that proper inflation of the airbag 20 is achieved.

Figure 4:
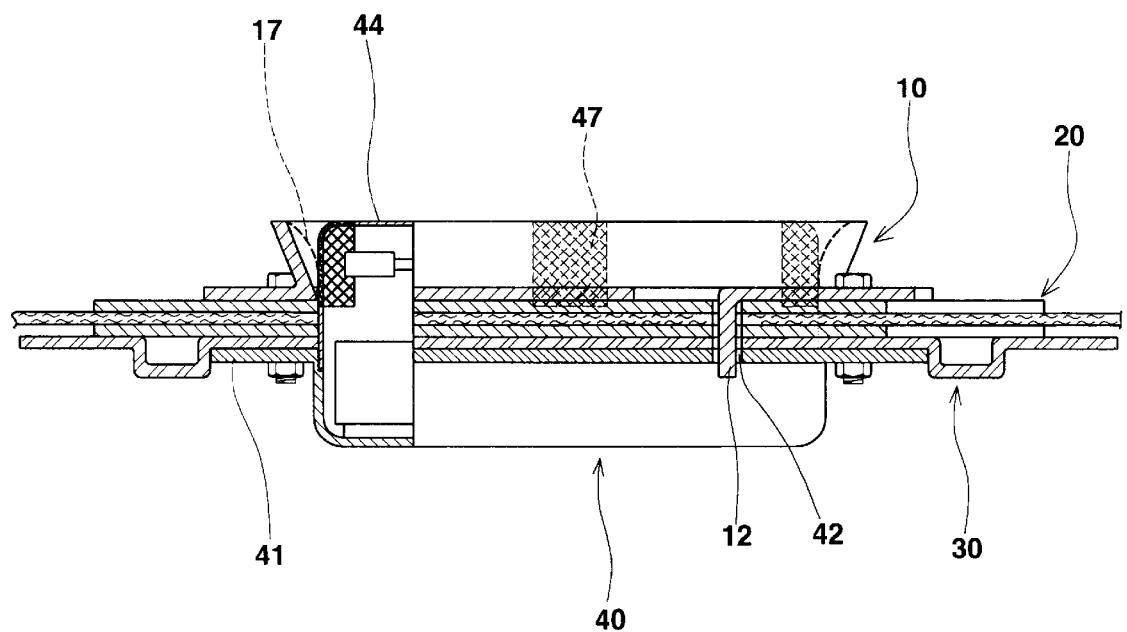
FIG. 4 is a cross-sectional view taken along line IV—IV of FIG. 3.
Figure 5:
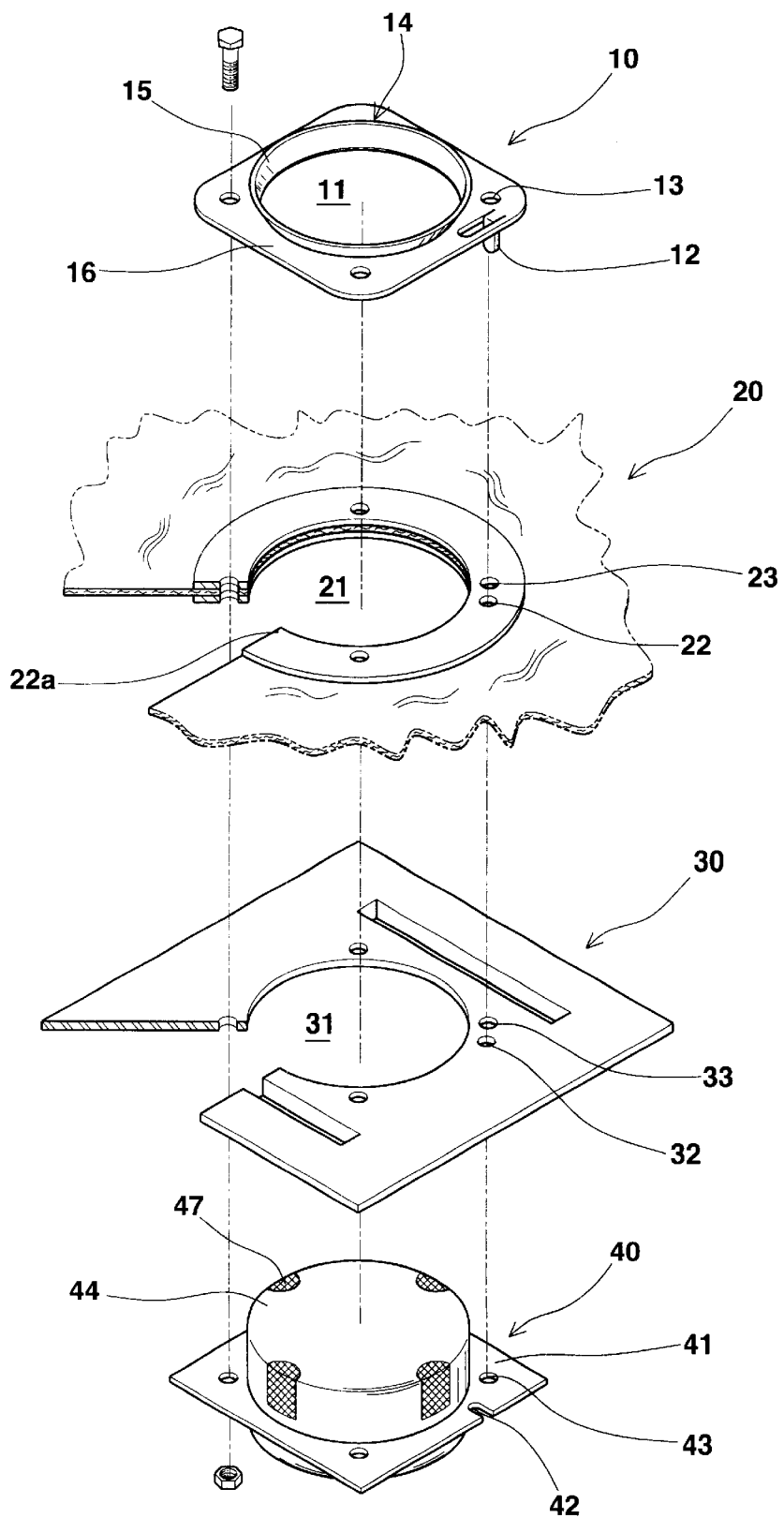
FIG. 5 is an exploded perspective view of the airbag mounting structure shown in FIG. 2.
Figure 6:
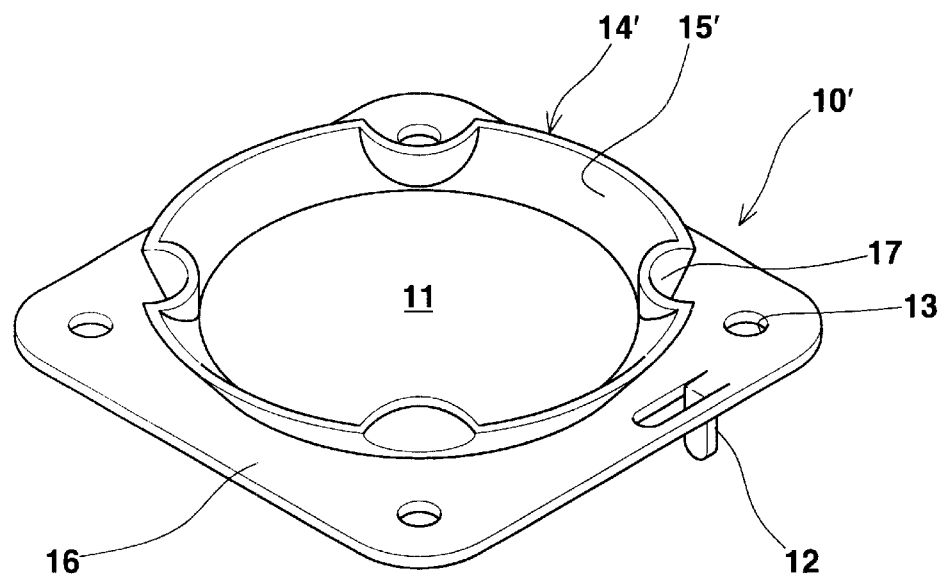
FIGS. 6 and 7 are perspective views illustrating preferred embodiments of the retainer ring having an air deflector according to the present invention.

Referring to FIG. 6, a retainer ring 10' includes an air deflector 14' according to a preferred embodiment of the present invention. The air deflector 14' is provided with a wall 15' comprising a plurality of semi-circular convex portions 17 projecting inwardly towards the perimeter of the inflater opening 11, which are regularly spaced to provide support to the inflater 40 at the sides of the main body 44 thereof, when the inflater is inserted through the inflater openings 11, 21, and 31 and properly seated as shown in FIG. 4. The convex portions 17 are formed around the circumference of the wall 15' at positions corresponding to the coupling holes 13 and do not coincide with the inflation ports 47.

Figure 7:
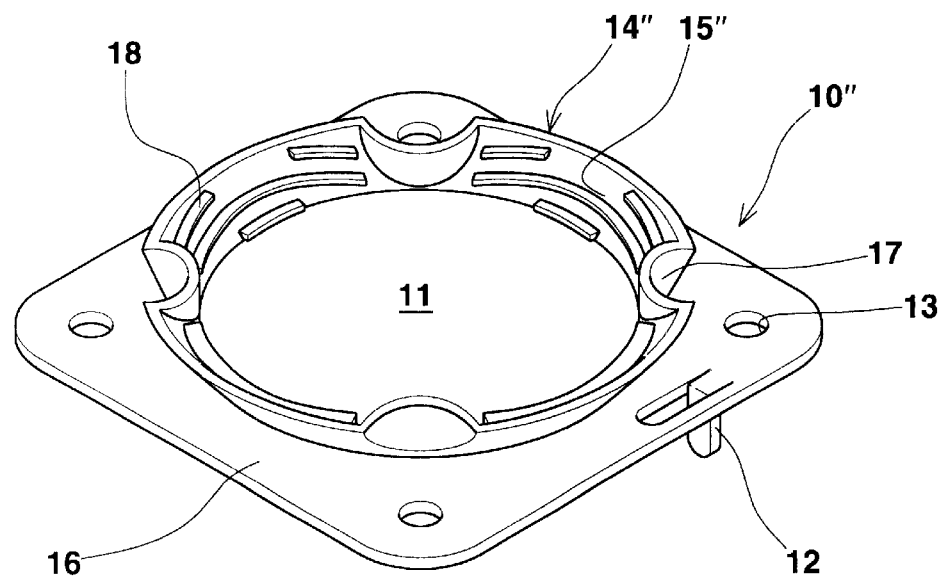

Referring to FIG. 7, a retainer ring 10" includes an air deflector 14" according to another preferred embodiment of the present invention. The air deflector 14" is provided with a wall 15" further comprising a plurality of rib formations 18 integrally formed on the inner side of the wall in a discontinuous manner interrupted by the convex portions 17, thus corresponding to the location of the inflation ports 47 and blocking a downward flow of hot air expelled therefrom, to thereby prevent the burning of an unprotected portion (between the mounting surfaces 20a) of the throat of the airbag 20 while diffusing and deflecting the gas upward. The rib formations 18 slope downward on either side of the convex portions 17. The rib formations 18 are preferably evenly spaced as a pair of rows covering the height of the inner side of the wall 15".

Accordingly, the above-described simplified configuration of the retainer ring having an air deflector, comprising the wall, the convex portions, and the rib formations, blocks the downward discharge of hot inflation gas, to prevent the throat of the airbag from being burned thereby.

Since the present invention may be embodied in various forms, without departing from the essential characteristics thereof, it should be understood that the above-described embodiment is not to be limited by any of the details of the foregoing description, unless otherwise specified, but should be construed only as defined in the appended claims. Thus, all modifications that fall within the scope of the claims are therefore intended to be embraced thereby.

What is claimed is:

1. A retainer ring having an air deflector, for use with an airbag mounting structure, said retainer ring comprising:

an upper flange in which an inflater opening for receiving an inflater is formed; and a wall with a continuous and leveled top surface, a base of the wall being connected to the upper flange, extending upward and outward from the inflater opening at a predetermined angle to diffuse and deflect exploding gas upward, wherein said wall comprises a plurality of convex portions projecting inwardly towards the inflater opening, said plurality of convex portions being regularly spaced.

2. The retainer ring as claimed in claim 1, wherein said plurality of convex portions are semi-circular in shape.

3. The retainer ring as claimed in claim 1, wherein said wall further comprises a plurality of rib formations integrally formed on an inner side of said wall between said convex portions.

4. The retainer ring as claimed in claim 3, wherein said plurality of rib formations slope downward on either side of said plurality of convex portions.

5. The retainer ring as claimed in claim 3, wherein said plurality of rib formations are evenly spaced as a pair of rows covering the height of the inner side of said wall.

6. An airbag mounting structure comprising:

an inflater including a plurality of inflation ports provided on a main body thereof and arranged around the circumference of the main body, and a lower flange in which a plurality of first coupling holes and an alignment notch are formed at predetermined positions;

a baseplate in which a first circular opening is formed to seat the main body of said inflater, a plurality of second coupling holes and a first alignment hole, corresponding to the first coupling holes, being formed in said baseplate around the first circular opening;

an airbag, in which a second circular opening is formed to receive the main body of said inflater, having a mounting surface provided around the second circular opening, in which a plurality of third coupling holes and a second alignment hole, corresponding to the first and second coupling holes and the first alignment hole, respectively, are formed;

a retaining ring in which a third circular opening is formed to receive the main body of said inflater, a plurality of fourth coupling holes and a third alignment hole being formed in an upper flange to correspond to the first, second, and third coupling holes and the first and second alignment holes, respectively, said retainer ring including an integrally formed air deflector and a tabbed cut-out juxtaposed to one of the fourth coupling holes, the tabbed cut-out being bent at a right angle;

wherein the tabbed cut-out passes through the alignment notch and the first, second, and third alignment holes during assembly, to determine a mounting position and orientation; and an inflater including a plurality of convex portions projecting inwardly toward the inflater opening, said plurality of convex portions being regularly spaced around the circumference of said wall at positions corresponding to the first through fourth coupling holes and abutting a surface of the main body of said inflater when said inflater is seated with said baseplate, to support the main body of said inflater.

7. The retainer ring as claimed in claim 6, wherein said plurality of convex portions are semi-circular in shape.

8. The retainer ring as claimed in claim 6, wherein said wall further comprises a plurality of rib formations integrally formed on an inner side of said wall between said convex portions.

9. The retainer ring as claimed in claim 8, wherein said plurality of rib formations slope downward on either side of said plurality of convex portions.

10. The retainer ring as claimed in claim 8, wherein said plurality of rib formations are evenly spaced as a pair of rows covering the height of the inner side of said wall.

11. An airbag mounting structuring comprising:
- an inflater including a plurality of inflation ports provided on a main body thereof and arranged around the circumference of the main body;
- a baseplate including a first circular opening formed to seat the main body of said inflater;
- an airbag including a second circular opening formed to receive the main body of said inflater and a mounting surface provided around the second circular opening; and
- a retainer ring including a third circular opening formed to receive the main body of said inflater and an air deflector which is provided with an upper flange subject to forming said inflater opening, a wall and a base connected to the upper flange, extending upward and outward from said inflater opening to deflect exploding gas upward; in which:
  - said inflater includes a lower flange, in which a plurality of first coupling holes and an alignment notch are formed at predetermined positions;
  - said base plate includes a plurality of second coupling holes and a first alignment hold, corresponding to the first coupling holes, which are formed in said baseplate around the first circular opening;
  - said airbag includes a plurality of third coupling holes and a second alignment hole, corresponding to the first and second coupling holes and the first alignment hole, respectively, formed, and a mounting surface having a tethered collar provided with a heat-resistant coating layer extending beyond the upper flange of the said retainer ring, to mate with mounting surface of said retainer ring;
  - said retainer ring includes a plurality of fourth coupling holes and a third alignment hole formed in an upper flange to correspond to the first, second, and third coupling holes and the first and second alignment holes, respectively;
  - said air deflector including the wall leveled higher than the top of the main body of the inflater, integrally extending upward and outward from the inflater opening at a predetermined angle to deflect the exploding gas upward, and a tabbed cut-out juxtaposed to one of the fourth coupling holes, the tabbed cut-out being bent at a right angle and U-shaped, wherein the tabbed cut-out passes through the alignment notch and the first, second, and third alignment holes during assembly, to determine a mounting position and orientation; and
  - said wall comprising a plurality of convex portions projecting inwardly toward the inflater opening, said plurality of convex portions being regularly spaced around the circumference of said wall at positions corresponding to the first through fourth coupling holes and abutting a surface of the main body of said inflater is seated with said baseplate, to support the main body of said inflater.

12. The airbag mounting structure as claimed in claim 11, wherein said plurality of convex portions are semi-circular in shape.

13. The airbag mounting structure as claimed in claim 11, wherein said wall further comprises a plurality of rib formations integrally formed on an inner side of said wall between said convex portions.

14. The airbag mounting structure as claimed in claim 13, wherein said plurality of rib formations slope downward on either side of said plurality of convex portions.

15. The airbag mounting structure as claimed in claim 13, wherein said plurality of rib formations are evenly spaced as a pair of rows covering the height of the inner side of said wall.

\* \* \* \* \*